Feb. 23, 1943.  J. A. PURVIS  2,311,999
BALANCED TIRE ASSEMBLY
Filed Feb. 7, 1940

INVENTOR.
Judson A. Purvis
BY Parkinson & Lane
ATTORNEYS.

Patented Feb. 23, 1943

2,311,999

UNITED STATES PATENT OFFICE 2,311,999

BALANCED TIRE ASSEMBLY

Judson A. Purvis, Chicago, Ill.

Application February 7, 1940, Serial No. 317,733

8 Claims. (Cl. 152—330)

The present invention relates to tire assemblies and more particularly to a novel means of balancing tire and wheel assemblies.

Rotation of tires and wheels at the high speeds at which automobiles of the present day are being operated presents problems and difficulties not appreciated or encountered previously. The rotation of the wheels and tires at these relatively higher speeds and the decrease in the diameter of the wheels causes centrifugal and gyroscopic forces to be set up which interfere with the proper control and steering of the automobile unless the tires and wheel assemblies have been accurately balanced and maintained in dynamic or rotating balance. In this connection it will be appreciated that any one or more parts of the wheel assembly which rotates as a unit may be out of balance, so that any adjustment must compensate for such unbalance.

This state of unbalance may not be noticeable to the operator until the wheel assembly rotates at a relatively high rate of speed, when it sets up a wobbling action familiarly known as "shimmy" or "tramp," resulting in a loss of steering control of the front wheels of an automobile.

Even though it may be possible to originally balance the entire wheel assembly by the manufacturer, the changing of a wheel, tire or tube is likely to throw the assembly out of balance, and that balance is disturbed each time any one of these parts is replaced. It will be clearly evident that since the wheel is mounted by means of spaced bolts, a slight variation in the bolt holes can and does affect and offset such balance so that each wheel may be mounted out of balance each time it is removed and replaced upon the hub.

As the pneumatic tire is the part farthest removed from the axis and center of rotation of the wheel assembly, it will be apparent that a smaller amount of unbalance in the tire or tire assembly will create a greater force affecting steering control than a part nearer the hub. Any amount of uneven wear on the tire may soon throw the entire assembly out of balance.

The recent extended use of the so-called "blowout proof" inner tubes of the dual chamber type has had a tendency to aggravate unbalancing due to the increased mass of material rotating at a considerable distance from the center of rotation. For this reason, the invention comprehends balancing the assembly at a point farthest removed from the axis of the wheel and at which point a minimum amount of weight will be required to effect such balance. Furthermore, the novel invention does not contemplate the necessity of adding any additional rubber to the casing or tread of the tire but does comprehend rearranging or reconstructing the tread in such manner as to measurably increase heat dissipation through the provision of a greater extent or area of radiating surface.

The present invention comprehends a novel means and method of balancing the tire and wheel assembly by means of balancing weights which are preferably inserted or carried within spaced treads of an automobile tire in such manner that they are unaffected by wear of the tread and not subject to the danger of the weights becoming detached when the tire brushes or scrapes against the curb or any other object.

In the preferred embodiment, the tire treads or casing is provided with openings or passages of an internal diameter or size sufficiently less than the external diameter or dimensions of suitable weights or pellets to be received therein, so that these weights are retained by friction and the inherent resiliency and contraction of the rubber or material of the tread. These openings are preferably inclined and located in such manner as to have the dual function of receiving the weights and/or providing a means of heat dissipation, so essential to high speed travel. An opening or vent of smaller diameter or cross section leads from the larger opening or passageway to the treads whereby to provide a continuous passage therethrough. These aligned or connected openings or passageways provide a path for the discharge of any water, dirt or other particles that may lodge or accumulate therein, as well as provide for more rapid and complete dissipation of heat generated within the tire. The smaller vents have the added function of facilitating removal of the weights if desired by the insertion of a pointed instrument or tool.

Another object of the present invention is to provide a novel means for balancing the tire casing and wheel assembly so as to maintain dynamic and static balance.

Further objects, advantages and capabilities will be apparent from the following description and disclosure in the drawing or are inherent in the device.

Figure 1:
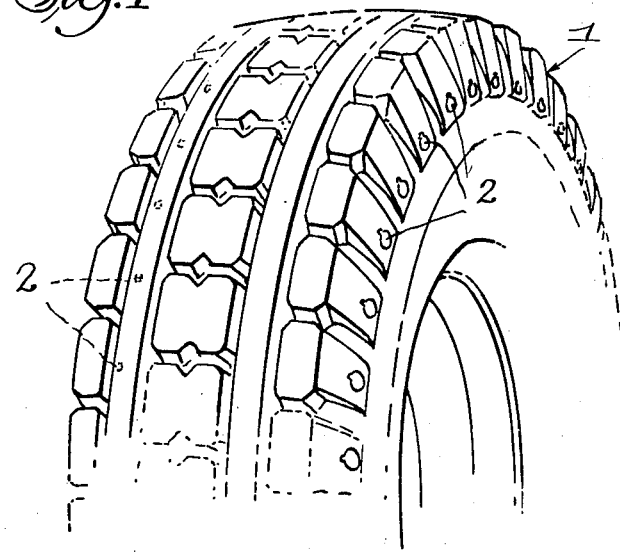
Fig. 1 is a fragmentary view in perspective of a tire or casing embodying my novel invention.
Figure 4:
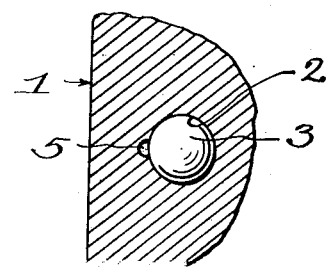
Fig. 4 is a cross sectional view taken on the line 4—4 of Fig. 3.
Figure 3:
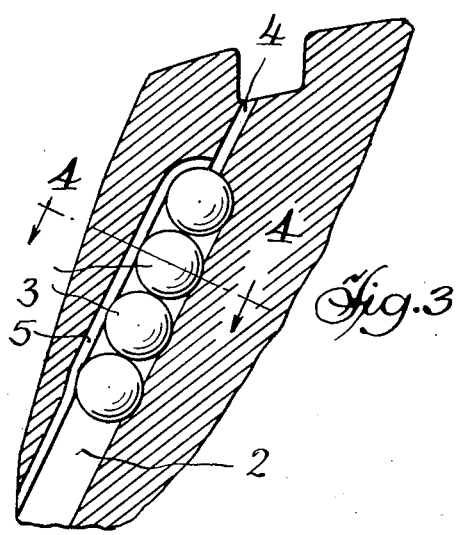
Fig. 3 is a fragmentary enlarged view in vertical cross section through the casing showing in detail the aligned or connected passages.
Figure 2:
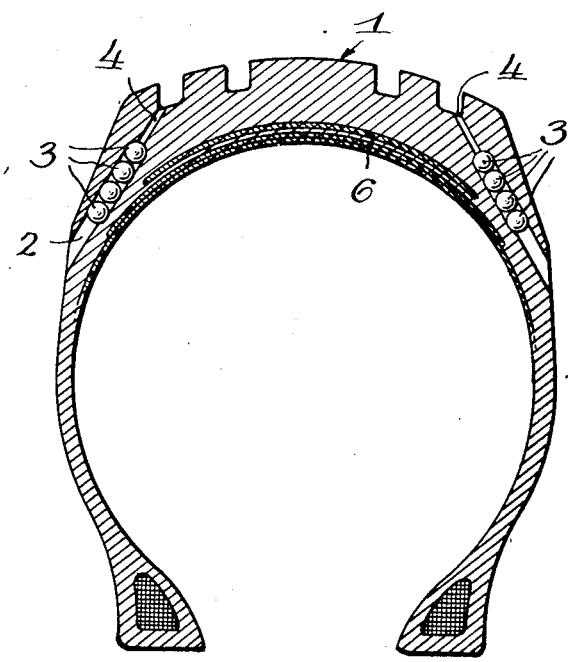
Fig. 2 is a view in vertical cross section through the casing.

Referring more particularly to the disclosure in the drawing, the casing 1 is provided with any desired form of tread, it being understood that the invention is not limited to any particular style or design of tread but may be embodied in any standard or conventional form of tread or tire casing now on the market. The novel invention comprehends forming in suitable treads or in the casing wall, spaced openings or slots 2 of an internal diameter or cross section somewhat less than the external diameter or dimensions of balancing weights or pellets 3, which may be of any desired shape suitable for the purpose. In the illustrative embodiment, these weights are shown in the form of balls of any desired metal having sufficient weight for the purpose. Excellent results have been secured by making these pellets of lead or other preferably non-corrosive metal. Aligned or connected with each opening 2 is a smaller opening or bore 4 forming a passage and vent to the base of the tread, as well as providing a means for inserting a tool for removal of the weights, should that become necessary. This smaller opening permits discharge of water as well as any dirt or foreign particles which may accumulate or become lodged in the aligned or connected openings, but is of such a size or diameter that there is no possibility or danger of the weights or pellets being projected therethrough by centrifugal force. In order to insure a free passageway through the connected openings, even though weights are inserted in the larger passage, I preferably provide an auxiliary channel or recess 5, as more clearly shown in Figs. 3 and 4. These passageways or bores have the added advantage of cooling the tire by dissipating heat from the interior of the tire structure and in nowise decrease the life and efficiency of the casing. It will be apparent from Fig. 2 of the drawing that the weights do not extend above or beyond the breaker strips 6 so that the tire is never worn sufficiently to expose and permit accidental ejection of these weights. Also, these weights are disposed sufficiently inward from the side wall of the tire that they are unaffected by the tire scraping or brushing against the curb.

It will be evident that the weights may be readily inserted into the opening 2 and when so inserted, can not be ejected by centrifugal force. The openings are preferably spaced and provided in the opposite side walls or treads of the tire as shown, although it is to be understood that the weights may be inserted in one or more of the spaced openings on one or both sides of the tire, as desired or required to balance the assembly.

Having thus disclosed the invention, I claim:

1. In combination with a pneumatic tire casing of resilient material, means for balancing the tire assembly comprising apertures formed at spaced points in the tire casing, balancing weights inserted and anchored in one or more of said apertures, and an abutment in each of said apertures for preventing displacement of the weights by centrifugal force.

2. In combination with a pneumatic tire casing of resilient material, means for balancing the tire assembly comprising elongated openings provided at spaced points in the tire casing and so arranged as to be subjected to longitudinal and lateral distortion as weight and traction is applied to the tire casing, weights forced into one or more of said openings for balancing the assembly, and means for retaining said weights in said openings when the casing and openings are subjected to longitudinal and lateral distortion.

3. In combination with a pneumatic tire casing of resilient material, means for balancing the tire assembly comprising elongated openings provided at spaced points in the tire casing and so arranged as to be subjected to longitudinal and lateral distortion as weight and traction is applied to the tire casing, weights forced into one or more of said openings for balancing the assembly, means for retaining said weights in said openings when the casing and openings are subjected to longitudinal and lateral distortion, and vents associated with said openings but of lesser cross section to provide a passage for accumulated dirt or other foreign particles collected in the openings and for dissipating heat from the interior of the tire.

4. In combination with a pneumatic tire casing, means for balancing the tire assembly comprising slots provided at spaced points in the tread of the tire, weights inserted into one or more of said slots and retained by the resiliency and contraction of the material of the tire, vents leading from said slots to provide a passage for water and accumulated dirt or other particles collected in the slots and for dissipating heat from the interior of the tire, and a by-pass connecting with each slot and vent for providing a continuous passage therethrough.

5. The herein described method of balancing a rubber tire which consists in forming in a selected portion of the tread periphery one or more holes of small cross section extending laterally into the rubber of the tire tread, and forcing into said holes slugs of metal of a cross sectional size greater than the holes.

6. The herein described method of balancing a rubber tire which consists in forming in a selected portion of the tread periphery one or more holes of small cross section extending from a side face of a tire shoulder and at an outward inclination, and passing a metal slug of a cross sectional size greater than the hole into each hole to adjacent the inner end thereof.

7. In combination with a pneumatic tire casing of resilient material, means for balancing the tire assembly comprising openings provided at spaced points in the tire casing and so arranged as to be subjected to longitudinal and lateral distortion as weight and traction is applied to the tire casing, and weights of greater cross section than that of the openings forced into one or more of said openings for balancing the assembly.

8. In combination with a pneumatic tire casing of resilient material, means for balancing the tire assembly comprising slots provided at spaced points and extending laterally into the tread of the tire, and weights inserted into one or more of said slots, said weights being of greater cross section than the slots whereby they are retained by the resiliency and contraction of the material of the tire.

JUDSON A. PURVIS.